United States Patent
Even et al.

(10) Patent No.: US 9,556,284 B2
(45) Date of Patent: Jan. 31, 2017

(54) EMULSION POLYMER ADHESIVES

(75) Inventors: Ralph Craig Even, Blue Bell, PA (US); Sekhar Sundaram, Haverford, PA (US)

(73) Assignee: Rohm and Haas Company, Philadelphia, PA (US)

( * ) Notice: Subject to any disclaimer, the term of this patent is extended or adjusted under 35 U.S.C. 154(b) by 259 days.

(21) Appl. No.: 12/456,125

(22) Filed: Jun. 11, 2009

(65) Prior Publication Data

US 2010/0003442 A1 Jan. 7, 2010

Related U.S. Application Data

(60) Provisional application No. 61/133,780, filed on Jul. 2, 2008.

(51) Int. Cl.
*C08F 2/38* (2006.01)
*C08F 2/22* (2006.01)
*C08L 33/08* (2006.01)
*C08L 33/14* (2006.01)

(52) U.S. Cl.
CPC . *C08F 2/38* (2013.01); *C08F 2/22* (2013.01); *C08L 33/08* (2013.01); *C08L 33/14* (2013.01); *C08L 2205/02* (2013.01); *Y10T 428/1452* (2015.01); *Y10T 428/2878* (2015.01)

(58) Field of Classification Search
CPC ......... C08L 33/08; C08L 2666/04; C08F 2/22; C08F 2/38
See application file for complete search history.

(56) References Cited

U.S. PATENT DOCUMENTS

| | | | |
|---|---|---|---|
| 4,814,373 A * | 3/1989 | Frankel et al. | 524/460 |
| 5,081,166 A | 1/1992 | Kiehlbauch et al. | |
| 5,093,405 A | 3/1992 | Frankel et al. | |
| 5,227,433 A | 7/1993 | Frankel et al. | |
| 5,252,657 A | 10/1993 | Frankel et al. | |
| 6,060,532 A | 5/2000 | Frankel et al. | |
| 6,262,114 B1 * | 7/2001 | Nakai et al. | 514/533 |
| 6,262,144 B1 * | 7/2001 | Zhao et al. | 523/201 |
| 7,241,834 B2 * | 7/2007 | Even | 524/556 |
| 7,723,396 B2 * | 5/2010 | Even et al. | 521/66 |
| 2002/0090459 A1 * | 7/2002 | Even | 427/385.5 |
| 2003/0077443 A1 * | 4/2003 | Di Stefano | 428/355 AC |
| 2003/0125459 A1 * | 7/2003 | Wulff et al. | 524/800 |
| 2003/0143409 A1 | 7/2003 | Di Stefano | |
| 2006/0182958 A1 * | 8/2006 | Okochi et al. | 428/355 AC |
| 2006/0263600 A1 | 11/2006 | Bartholomew et al. | |
| 2008/0176996 A1 * | 7/2008 | Even | 524/575.5 |
| 2008/0281005 A1 * | 11/2008 | Even et al. | 521/66 |
| 2010/0003442 A1 * | 1/2010 | Even et al. | 428/41.3 |

FOREIGN PATENT DOCUMENTS

| | | |
|---|---|---|
| EP | 0 586 966 A2 | 3/1994 |
| EP | 1 780 250 A1 | 5/2007 |
| WO | WO 94/03550 A1 | 2/1994 |

* cited by examiner

*Primary Examiner* — Michael A Salvitti

(57) ABSTRACT

The invention relates to multi-stage polymer emulsions suitable for forming pressure sensitive adhesives with high peel and high temperature cohesion.

13 Claims, No Drawings

EMULSION POLYMER ADHESIVES

This invention claims priority to U.S. Provisional Application No. 61/133,780 filed Jul. 2, 2008.

The present invention relates to latex polymer emulsions with high peel, high temperature cohesion, and balance of other pressure sensitive adhesive (PSA) properties.

Historically, solvent-based adhesives have been preferred for applications requiring a balance of such performance properties. Environmental considerations, however, favor elimination of solvents. This and higher coating speeds attainable with emulsion PSAs, favor their use in place of solvent-based PSAs. Typically, PSAs displaying such high and desirable levels of peel and adhesion do so at the cost of poor cohesive strength at elevated temperatures.

U.S. patent application Ser. No. 12/004,242 discloses aqueous dispersions of water-insoluble latex polymer formed by a two stage process where the first stage polymer comprises at least 40% of a monomer having a homopolymer Tg of less than −40° C., and 10 to 50% of a soft hydrophilic, nonionic monomer having a homopolymer Tg of less than 30° C. The resulting compositions may be useful as PSAs with improved water resistance. These polymers may be formed in the presence of broad range of chain transfer agent. Although U.S. patent application Ser. No. 12/004,242 attempts to solve problems associated with cohesion/adhesion balance, it does not address the formation of the inventive latices which achieve the balance of those desirable performance properties at high temperatures. The present invention solves this problem by use of a select balance of chain transfer agent and reinforcing second stage polymer.

The present invention provides a pressure sensitive adhesive formed by a multi-staged emulsion polymerization process. The resulting adhesive comprises at least one soft first polymer and at least one reinforcing polymer. According to the invention, a first soft polymer is formed in a polymerization stage in the presence of 3 to 12 mmoles of chain transfer agent per kg of monomer, said first polymer having a Tg of less than −20° C. In a subsequent polymerization stage, a reinforcing polymer is formed in the presence of said first polymer. The resultant polymer is useful as a PSA with high peel while retaining a good balance of other PSA properties.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylonitrile" refers to either acrylonitrile or methacrylonitrile; and the term "(meth)acrylamide" refers to either acrylamide or methacrylamide. The term "(co)polymer" as used herein refers to homopolymers and copolymers.

"Glass transition temperature" or "$T_g$" as used herein, means the temperature at or above which a glassy polymer will undergo segmental motion of the polymer chain. Glass transition temperatures of a polymer can be estimated by the Fox equation; see, *Bulletin of the American Physical Society*, 1, 3, p. 123 (1956). The values of $T_g$ reported herein are calculated using the Fox equation.

As used herein, "multi-stage polymer" means a polymer formed in two stages ("two-stage") or more than two stages, in which the second stage polymer and any subsequent stage polymers are polymerized in the presence of the first and earlier stage polymers. A multi-stage polymer may further comprise other polymers which are blended, admixed or otherwise added to it.

As used herein, "reinforcing polymer" means a polymer polymerized in the presence of the first polymer, which either has a Tg of 60° C. or higher, or is formed from monomers having two or more alpha, beta-ethylenically unsaturated groups, or combinations thereof.

In one embodiment of the invention, there is provided a multi-stage emulsion polymer comprising (a) 90 to 99.5 wt. % of a first polymer, based on total weight of first polymer and reinforcing polymer, wherein the first polymer is formed from at least one ethylenically unsaturated monomer, and has a Tg of less than −20° C., and is polymerized in the presence of 3 to 12 mmoles of chain transfer agent per kg of monomers in the first polymer; and (b) 0.5 to 10 wt. % of a reinforcing polymer based on total weight of first polymer and reinforcing polymer. The monomers used to form the reinforcing polymer are dispersed in the first polymer and may swell the first polymer prior to polymerization of the monomers to form the reinforcing polymer.

In one embodiment of the present invention, there is provided a latex polymer emulsion prepared by a process comprising the steps: (a) emulsion polymerization of a first stage polymer of at least one ethylenically unsaturated monomer, wherein the first stage polymer has a Tg of less than −20° C., and wherein the polymerization is carried out in the presence of 3 to 12 mmoles of chain transfer agent per kg of monomers in the first stage; (b) addition to the first stage polymer of monomers to form the reinforcing polymer, such monomers selected from the group consisting of (i) monomers capable of forming a polymer with a Tg of 60° C. or higher, and (ii) monomers having two or more alpha, beta-ethylenically unsaturated groups, and (iii) combinations thereof, wherein the addition is carried out under conditions wherein no significant polymerization occurs; and (c) polymerizing the monomers to form the reinforcing polymer in the presence of the first stage polymer.

In another embodiment of the present invention, there is provided a composite article comprising a substrate and a film formed from a multi-stage emulsion polymer comprising (a) 90 to 99.5 wt. % of a first polymer, based on total weight of first polymer and reinforcing polymer, wherein the first polymer is formed from at least one ethylenically unsaturated monomer, and has a Tg of less than −20° C., and is polymerized in the presence of 3 to 12 mmoles of chain transfer agent per kg of monomers in the first polymer; and (b) 0.5 to 10 wt. % of a reinforcing polymer based on total weight of first polymer and reinforcing polymer.

In another embodiment of the present invention, there is provided a composite article comprising a substrate and a film formed from a latex polymer emulsion prepared by a process comprising the steps: (a) emulsion polymerization of a first stage polymer of at least one ethylenically unsaturated monomer, wherein the first stage polymer has a Tg of less than −20° C., and wherein the polymerization is carried out in the presence of 3 to 12 mmoles of chain transfer agent per kg of monomers in the first stage; (b) addition to the first stage polymer of monomers to form the reinforcing polymer, wherein the monomers are selected such that the reinforcing polymer either has a Tg of 60° C. or higher, or is formed from monomers having two or more alpha, beta-ethylenically unsaturated groups, or combinations thereof, wherein the addition is carried out under conditions wherein no significant polymerization occurs; and (c) polymerizing the monomers to form the reinforcing polymer in the presence of the first stage polymer.

In these embodiments, the substrate may comprise tape or label backing, rigid or flexible films, metallized films, synthetic and natural foams, thermoplastic and thermosetting substrates (i.e., plastics such as PVC and PET), flocked substrates, plasticized and non-plasticized polymeric substrates, paper, cardboard, plastic-based composites, cellulosic-based composites, metals and other materials. In one embodiment, the substrate comprises polyvinyl chloride resin, with or without at least one plasticizer. In mounting tape applications, the substrates may be plastics, metals, plasters, wood, cellulosic composites, plastic composites and combinations thereof. Plasticizers present in the substrate may be polymeric or monomeric plasticizers; preferably such plasticizers are monomeric plasticizers.

The preparation of aqueous dispersions of water-insoluble latex polymers by emulsion polymerization is well known in the art. The practice of emulsion polymerization is discussed in detail in D. C. Blackley, *Emulsion Polymerization* (Wiley, 1975). Conventional emulsion polymerization techniques may be used to prepare the first and subsequent water-insoluble latex polymers of this invention.

The practice of emulsion polymerization is also discussed in H. Warson, *The Applications of Synthetic Resin Emulsions*, Chapter 2 (Ernest Benn Ltd., London 1972).

Thus, monomers may be emulsified with an anionic, cationic or nonionic dispersing agent, using, for example, from about 0.25% to 5% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid.

Suitable cationic dispersion agents include lauryl-pyridinium chlorides, cetyldimethyl amine acetate, and alkyldimethylbenzylammonium chlorides in which the alkyl group has from 8 to 18 carbon atoms.

Suitable anionic dispersing agents include, for example, the higher fatty alcohol sulfates, such as sodium lauryl sulfate, and the like; alkylaryl sulfonates such as sodium or potassium isopropylbenzene sulfonates or isopropyl naphthalene sulfonates, and the like; alkali metal higher alkyl sulfosuccinates, such as sodium octyl sulfosuccinate, sodium N-methyl, N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxy-thanols, methyloctylphenoxypolyethoxyethanols, and the like; polyethoxy-thanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or higher, and may be optimized for the catalyst system employed, as is conventional. Emulsion polymerization may be seeded or unseeded. Seeded polymerization tends to yield aqueous dispersions of latex polymer having more uniform physical properties than unseeded polymerization.

Chain transfer agents including mercaptans, polymercaptans and polyhalogen compounds are used in the polymerization mixture to moderate polymer molecular weight of the first polymer. They may also be used in the formation of the reinforcing polymer. Examples of chain transfer agents which may be used include long chain alkyl mercaptans such as t-dodecyl mercaptans, methyl 3-mercaptopropionate, alcohols such as isopropanol, isobutanol, lauryl alcohol or t-octyl alcohol, carbon tetrachloride, tetrachloroethylene and trichloro-bromoethane. In the present invention, the chain transfer agent is charged to the monomer mixture for the first polymer at lower limits of 3 or 4 to upper limits of 9 or 12 mmoles per kilogram of monomer in the first stage. All ranges are inclusive and combinable. Additional chain transfer agent may be used in forming the reinforcing polymer.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be subjected to a monomer reduction step to minimize the concentrations of unreacted monomer and unreacted polymerization catalyst species. The pH of the contents of the reaction vessel may also be altered during the course of the emulsion polymerization process. Both thermal and redox polymerization processes may be employed.

The monomers used in preparing the first stage polymer may be any of those conventionally used in the synthetic resin emulsion art. Acrylic monomers are preferred for preparing latex polymer to be used in adhesive coating compositions. Examples of acrylic monomers include the ($C_1$-$C_{24}$) alkyl esters of acrylic and methacrylic acids. Examples of ($C_1$-$C_{24}$) alkyl groups of esters of acrylic and methacrylic acids which may be used in forming the first stage polymer used in the invention include: methyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl, stearyl groups and the like. Specific examples include: methyl methacrylate, ethyl acrylate, or n-butyl acrylate, 2-ethylhexyl acrylate, lauryl methacrylate, isodecyl methacrylate, methyl acrylate, ethyl methacrylate, sec-butyl acrylate and t-butyl methacrylate. The ($C_1$-$C_{12}$) alkyl esters of acrylic and methacrylic acid are preferred in preparing the instant latex polymer. The monomer composition is selected to yield a first stage polymer having a glass transition temperature (Tg) characteristic of a random copolymer of less than −20° C.; or, −30° C. or less, or −40° C. or less.

In one embodiment, the first polymer of the present invention comprises at least 40% by weight of monomer in the first polymer of at least one monomer having a homopolymer Tg of less than −40° C., and 10 to 50% of at least one hydrophilic, nonionic, monomer having a homopolymer Tg of 30° C. or less, preferably less than 10° C. The hydrophilic monomer has water solubility of about 2% or greater at 25° C.; preferred monomers include ethyl acrylate, methyl acrylate, and vinyl acetate.

Other monoethylenically unsaturated polymerizable monomers useful in minor proportion (i.e., less than 5% by weight of the total monomer composition) as comonomers with acrylic monomers in preparing the first polymer of this invention include the vinylidene halides, vinyl halides, acrylonitrile, methacrylonitrile, vinyl esters such as vinyl formate, vinyl acetate and vinyl proprionate, and mixtures of ethylene and such vinyl esters, acrylic and methacrylic acid esters of alcohol ethers such as diethylene glycol monoethyl or monobutyl ether methacrylate, ($C_1$-$C_{10}$) alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Butyl acrylate, 2-ethyl-hexyl acrylate, iso-octyl acrylate are especially preferred monomers for the first polymer. In some preferred embodiments, the first polymer comprises from 0.25 to 5% of at least one nonionic monoethylenically unsaturated monomer having a homopolymer Tg of greater than 50° C., such as methyl methacrylate or styrene or other styrenic monomers.

Additional monoethylenically unsaturated polymerizable comonomers useful in preparing the first polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the first polymer.

Examples of alpha, beta-ethylenically unsaturated carboxylic acids which may be copolymerized with acrylic and other monomers in forming the first polymer of the invention include acrylic acid, methacrylic acid, beta-acryloxypropionic acid and higher oligomers of acrylic acid and mixtures thereof, ethacrylic acid, itaconic acid, aconitic acid, crotonic acid, citraconic acid, maleic acid, fumaric acid, alpha-chloroacrylic acid, cinnamic acid, mesaconic acid and mixtures thereof. Acrylic and methacrylic acids are preferred, and methacrylic acid is especially preferred. It is preferred that alpha, beta-ethylenically unsaturated carboxylic acid comprise an amount ranging from upper limits of 10, 5 or 3.5% to lower limits of 0.1, 0.25, or 0.5% by weight based on the total weight of monomer, of the monomer composition of the first polymer. All ranges are inclusive and combinable.

In addition to monoethylenically unsaturated monomer, small proportions of alpha, beta-ethylenically unsaturated monomer having at least two sites of alpha, beta-ethylenic unsaturation, that is, di- or multi-ethylenically unsaturated monomer, may be used as comonomer in preparing the first polymer. However, it is not necessary to employ any multi-ethylenically unsaturated monomer.

In some preferred embodiments, the first polymer may be formed in the presence of a polymerizable surfactant. Suitable ethylenically unsaturated surfactant monomers include, but are not limited to for example, salts or quaternary nitrogen compounds comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least on ethylenically unsaturated moiety. Other suitable examples are described in U.S. Pat. Publ. No. 2003/0149119.

Other suitable polymerizable surfactant monomers include nonylphenoxy propenyl polyethoxylated sulphate (for example as Hitenol™ from Daiichi Corp); sodium alkyl allyl sulphosuccinate (for example as Trem™ LF-40 from Henkel Corp); ammonium di-(tricyclo(5.2.1.0 2, 6) dec-3-en-(8 or 9)oxyethyl sulfosuccinate; and ammonium di-(tricyclo(5.2.1.0 2,6) dec-3-en-(8 or 9) sulfosuccinate. Additionally, the ammonium and metal salts of unsaturated $C_6$ to $C_{30}$ organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of tall oil rosin and fatty acids, disproportionated rosin acid, soybean oil fatty acids, olive oil fatty acids, sunflower oil fatty acids, linseed oil fatty acids, safflower oil fatty acids, sorbitan monooleate, abietic acid, poly(oxyethylene) sorbitol sesquioleate, and Empol™ 1010 Dimer Acid. Additional suitable polymerizable surfactant monomers also include, for example, maleate derivatives (as described in U.S. Pat. No. 4,246, 387), and allyl derivatives of alkyl phenol ethoxylates (as described in Japanese Patent 62-227435). The amount of surfactant used is typically from 0.1 to 6 wt. %, preferably 0.1 to 2 wt. %, based on the total weight of monomer.

Furthermore, a lower limit of 2, 3 or 5 wt. %, and an upper limit of 15, 20 or 25 wt. % (all ranges being inclusive and combinable), based on weight of monomer in the first polymer, of a low molecular weight polymeric component having a number average molecular weight of less than about 35,000 and a softening point of at least 40° C., as described in U.S. Pat. No. 4,912,169, may be blended in as a separate dispersion or formed in the presence of the first and/or second stage polymer as a separate polymerization step. Alternately, the first stage polymer may be formed in the presence of a low molecular weight polymeric component. The low molecular weight polymeric additive may be formed using polymerizable surfactant(s) of the types described above. The low molecular weight polymeric additive may function as a tackifier in the latex emulsion polymer.

A polymerization inhibitor may optionally be added to the polymerization process in making the first polymer. In the case of two-stage and multi-stage polymers, after preparation of the first polymer and prior to the second or subsequent stage(s), a polymerization inhibitor may be added or alternatively, the second or subsequent stage(s) in the process of preparing the compositions of this invention may be undertaken without the addition of the inhibitor.

In the second stage of the process, the monomers used to form the reinforcing polymer comprise monomers such as to form a polymer having a Tg of 60° C. or higher; monomers having two or more alpha, beta-ethylenically unsaturated groups; or combinations thereof. Alpha, beta-ethylenically unsaturated monomer having at least two sites of alpha, beta-ethylenic unsaturation may be referred to as "multifunctional monomer" or "MFM". In some embodiments, the reinforcing polymer comprises from 1 to 100%, preferably from 10 to 100%, more preferably from 20 to 100%, by weight of MFMs based on the total weight of reinforcing polymer. In some embodiments, the reinforcing polymer may have a Tg of 60° C. or higher and comprise no MFMs.

Monomers used in preparing reinforcing polymers with a Tg of 60° C. or higher include methyl methacrylate, styrene and other styrenic monomers, isobornyl methacrylate, and t-butyl methacrylate.

Examples of MFMs include ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerythritol pentaacrylate, dimethallyl chlorendate, diallyl chlorendate, diallyl fumarate, diallyl itaconate, diallyl phthalate, diallylisophthalate, triallyl isocyanate, triallyl trimellitate, 1,6-hexenediol diacrylate, 1,3-butylene glycol dimethacrylate, trimethylolpropane trimethacrylate, trimethylol propane triacrylate, tripropylene glycol diacrylate, diallyl methacrylate, and divinyl benzene.

It is preferred that the MFMs be selected from the group consisting of monomers having two sites of alpha, beta-ethylenic unsaturation and monomers having three sites of alpha, beta-ethylenic unsaturation. It is also preferred that monomers having two sites of alpha, beta-ethylenic unsaturation be selected from the diacrylates and dimethacrylates. It is also preferred that monomers having three sites of alpha, beta-ethylenic unsaturation be selected from the triacrylates and trimethacrylates. In another embodiment, it is preferred that the monomer having two sites of alpha, beta-ethylenic unsaturation be selected from a group comprising multifunctional styrenic monomers, such as divinyl benzene, which may either be used alone or in combination with other suitable MFMs. Of the preferred diacrylates and dimethacrylates, diethylene glycol dimethacrylate, ethylene glycol dimethacrylate, 1,6-hexene diol diacrylate, 1,3-butylene glycol dimethacrylate, and tripropylene glycol diacrylate are especially preferred. Of the preferred triacrylates and trimethacrylates, trimethylol propane triacrylate and trimethylol propane trimethacrylate are especially preferred.

Other monomers useful as MFMs include the reaction products of at least one compound selected from the diisocyanates and triisocyanates and at least one compound selected from hydroxy $(C_1-C_6)$ alkyl acrylates and the hydroxy$(C_1-C_6)$alkyl methacrylates. Examples of these include the reaction product of 3-hydroxypropyl methacrylate and 2,4-toluene diisocyanate, and the reaction product of 2-hydroxyethyl acrylate and hexamethylene diisocyanate. Similarly, the reaction products of at least one compound selected from the di- and tri-epoxy functional compounds and at least one compound selected from acrylic acid and methacrylic acids may be employed. In addition, monomers selected from the reaction products of at least one compound selected from the di($C_1-C_4$) alkoxylated ($C_2-C_8$) alkanediols, tri($C_1-C_4$) alkoxylated ($C_4-C_{12}$) alkane triols, and di($C_1-C_4$) alkoxylated bisphenol A, and at least one compound selected from acrylic acid and methacrylic acid may be employed. The reaction product of trimethylol propane and beta-acryloxypropionic acid may also be employed.

Preferably, the monomers used to form the reinforcing polymer should be selected such that they comprise a substantial proportion of monomer having low water solubility. Low levels, less than about 5% by weight based on the total weight of reinforcing polymer, of water soluble monomers such as ethylenically unsaturated carboxylic acids such as methacrylic acid or acrylic acid may be included in the monomers used to form the reinforcing polymer. Examples of MFMs which have low water solubility include trimethylolpropane trimethacrylate (water solubility at 25° C.: <0.01 g/100 g $H_2O$ (i.e., <0.01 wt. %)), 1,3-butyleneglycol dimethacrylate (<0.01 wt. %), 1,4-butyleneglycol dimethacrylate (0.07 wt. %), 1,6-hexanediol diacrylate (0.05 wt. %), trimethylolpropane triacrylate (0.17 wt. %), ethyleneglycol dimethacrylate (0.28 wt. %), and diethyleneglycol dimethacrylate (0.33 wt. %).

Additionally, the pressure sensitive adhesive may contain plasticizers, tackifiers, crosslinkers, multi-valent metal ion salts, defoamers, thickeners, rheology modifiers, pigments, and wetting agents.

Specific tackifiers useful in the present invention include both high softening point tackifiers and low softening point tackifiers. Typically they are present in ranges from upper limits of 50, 35 and 25 wt. % to lower limits of 0.5, 1 and 2 wt. % based on total weight of polymer. All ranges are inclusive and combinable. As used herein, high softening point tackifiers are defined as tackifiers having a softening point of 100° C. or greater, preferably from 100 to 130° C.; and low softening point tackifiers have a softening point of less than 100° C., preferably from 70 to up to 100° C. The tackifier resins include rosins, rosin esters, C5 and C9 based hydrocarbons, and hybrid blends of rosin and hydrocarbon resin. Typically these compounds are added as an aqueous dispersion. In one embodiment of the invention, the emulsion polymer further comprising tackifier with a softening point of 70° C. or higher.

Preferably, after the addition of monomer used to form the reinforcing polymer to the first stage polymer, sufficient time is allowed to permit the monomer to swell the latex particles. The monomer used to form the reinforcing polymer may be selected to include only those monomers which have low water solubility. By low water-solubility is meant a solubility in water at ambient temperature of less than about 2 g/100 g of water (2 wt. %). Preferably, the monomer is allowed to swell the first stage polymer until the monomer swollen first stage polymer has been swollen essentially to equilibrium with the additional alpha, beta-ethylenically unsaturated monomer. Preferably, less than 50%, more preferable less than 10%, most preferably less than 5% of the monomers used to form the reinforcing polymer are polymerized prior to completion of the addition of the monomers used to form the reinforcing polymer. The aqueous dispersion may be agitated during the swelling process.

After the first stage polymer has been swollen essentially to equilibrium, the monomer used to form the reinforcing polymer is polymerized within the monomer swollen initial latex polymer. That is, effective amount of initiator or other polymerization promoter is not present or introduced to the monomer mix until the first stage polymer has been swollen essentially to equilibrium; the condition prior to the introduction of effective amount of initiator or other promoter(s) is what is referred to herein as conditions wherein no significant polymerization occurs. Such conditions may be achieved by reducing polymerization in the aqueous dispersion by; 1) destroying residual initiator(s) used to form the first stage polymer by, for example, maintaining the dispersion of first stage polymer at such a temperature and for such a time as to decompose the initiator(s) thermally; 2) destroying residual initiator(s) used to form the first stage polymer by the addition of an appropriate reducing agent; 3) reducing or eliminating the formation of radicals in the dispersion by reducing the temperature of the dispersion; 4) the addition of free radical inhibitors to the dispersion; or combinations of two or more of the above. This second or subsequent stage polymerization may be initiated by conventional free radical generating initiator systems. Preferably the initiation occurs by way of redox initiation.

The latex polymer emulsion PSAs described above may be applied to various substrates to form the composites of the present invention. The substrate may comprise tape or label backing, rigid or flexible films, metallized films, synthetic and natural foams, thermoplastic and thermosetting substrates (i.e., plastics such as PVC and PET), flocked substrates, plasticized and non-plasticized polymeric substrates, paper, cardboard, plastic-based composites, cellulosic-based composites, metals and other materials. In one embodiment, the substrate comprises polyvinyl chloride resin with or without at least one plasticizer. In mounting tape applications, the substrates may be plastics, metals, plasters, wood, cellulosic composites, plastic composites and combinations thereof. Methods to prepare the composites of substrate and polymer emulsion are commonly known to those of ordinary skill in the art.

In some embodiments of the invention, composites of the substrate and polymer are adhered to low energy substrates, for example for automotive applications. Such low energy substrates may include acrylonitrile-butadiene-styrene (ABS), polypropylene (PP), high density polyethylene (HDPE), low density polyethylene (LDPE), lens finished PP, talc-filled PP, and thermoplastic polyolefins (TPO) and filled TPO.

EXAMPLES

A comparative sample of a multi-stage emulsion polymer in which the first stage polymerization was carried out without chain transfer agent was prepared as follows. A monomer emulsion containing the following materials was prepared:

| DI Water | 339.8 g |
|---|---|
| 2-ethylhexyl acrylate | 820.0 g |
| acrylic acid | 32.0 g |
| ethyl acrylate | 780.0 g |
| methyl methacrylate | 42.0 g |
| sodium carbonate | 2.5 g |
| disodium ethoxylated nonylphenol, half ester of sulfosuccinic acid (32%) | 11.9 g |
| sodium dodecylbenzene sulfonate (23%) | 20.7 g |
| methyl 3-mercaptopropionate (MMP) | 0.0 g |

Into a 5 liter, four-neck, round-bottomed flask equipped with a stirrer, thermometer, and reflux condenser was charged 800 g of deionized (DI) water which was heated to 83-85° C. in a nitrogen atmosphere.

At 83-86° C. the following materials were charged to the flask:

| $Na_2CO_3/H_2O$ | 1.10 g/34.8 g |
|---|---|
| $(NH_4)_2S_2O_8/H_2O$ | 5.7 g/57.9 g |
| monomer emulsion | 62.6 g |

Immediately after these charges, the monomer emulsion was fed at a rate calculated to give an 80 minute feed. A temperature of 83-85° C. was maintained by cooling as required.

Near the end of the monomer emulsion feed, the following solutions were prepared:
a second monomer emulsion containing the following materials:

| DI Water | 10.0 g |
|---|---|
| 1,3 butanediol dimethacrylate | 13.4 g |
| styrene | 20.1 g |
| sodium dodecylbenzene sulfonate (23%) | 0.4 g | and catalysts A and B:

| Catalyst A | t-butyl hydroperoxide (70%) | 4.4 g |
|---|---|---|
| | DI $H_2O$ | 21.6 g |
| Catalyst B | Bruggolite ™ FF6 M | 3.2 g |
| | DI $H_2O$ | 27.7 g |

When the monomer emulsion feed was complete, the temperature was held at 83-85° C. for 30 minutes. The reaction product was then cooled to 60° C. at which point, the second monomer emulsion was fed at a rate calculated to give a 5 minute feed. When the second monomer emulsion feed was complete, the temperature was held at 59-61° C. for 5 minutes. After the 5 minute hold, catalyst A and catalyst B were added to the flask. The reaction product was held for 20 minutes at temperature. During the hold, the following solutions were prepared:

| Catalyst C | t-butyl hydroperoxide (70%) | 9.2 g |
|---|---|---|
| | DI $H_2O$ | 32.5 g |
| Catalyst D | Bruggolite FF6 M | 6.8 g |
| | DI $H_2O$ | 41.8 g |
| Neutralizer | Aq $NH_3$ | 15.0 g |
| | DI $H_2O$ | 10.0 g |

After the hold was complete, catalyst solution C and catalyst solution D were fed at a rate calculated to give a 30 minute feed. The neutralizer was then fed at a rate calculated to give a 10 minute feed. The reaction product was then cooled to room temperature and filtered through a 100 mesh (0.149 mm sieve opening) screen.

The foregoing comparative example A was made with 0 mmol/kg monomer MMP in the first stage and with 2 wt. % reinforcing polymer. The following table has the weights for the components in the other comparative examples (B-L) and the examples of the present invention (1-4):

TABLE 1

| MMP (mmol/kg mmr) | Charge (g) | Reinforcing Polymer (wt. %) | Charges (g) BGDMA | STY | DS-4 | $H_2O$ |
|---|---|---|---|---|---|---|
| 0 | 0 | 2 | 13.4 | 20.1 | 0.4 | 10 |
| 2.09 | 0.42 | 3 | 20.1 | 30.15 | 0.6 | 15 |
| 4.18 | 0.84 | 4 | 26.8 | 40.2 | 0.8 | 20 |
| 8.36 | 1.68 | 5 | 33.6 | 50.4 | 1 | 25 |
| 16.73 | 3.36 | 7.5 | 50.4 | 75.6 | 1.5 | 37.5 |
| 25.09 | 5.04 | 10 | 67.2 | 100.8 | 2 | 50 |

MMP = methyl 3-mercaptopropionate
DS-4 = sodium dodecylbenzene sulfonate (23%)
BGDMA = 1,3-butanediol dimethacrylate
STY = styrene

TABLE 2

| Composition | Ex. Comp A | Comp B | 1 | 2 | 3 | 4 |
|---|---|---|---|---|---|---|
| mmole MMP/kg monomer | 0 | 0 | 4.18 | 4.18 | 8.36 | 8.36 |
| wt. % Reinforcing Polymer | 2 | 5 | 2 | 5 | 2 | 5 |
| avg. Peel SS 24 hr dwell (lbs) | 3.8 | 3.9 | 4.7 | 4.9 | 7.2 | 5.3 |
| SAFT (° C.) | >205 | >205 | >205 | >205 | 175.7 | >205 |
| Loop Tack on SS (lbs) | 2.7 | 2.4 | 3.3 | 3.1 | 3.8 | 3.2 |
| avg. Shear (hr), RT | 35.5 | 75+ | 21.1 | 75+ | 14.0 | 28.6 |
| Hot Shear (hr) @ 65° C. | >150 | >150 | >150 | >150 | >150 | >150 |

| Composition | Ex. Comp C | Comp D | Comp E | Comp F | Comp G |
|---|---|---|---|---|---|
| mmole MMP/kg monomer | 16.73 | 16.73 | 16.73 | 16.73 | 16.73 |
| wt. % Reinforcing Polymer | 2 | 5 | 7.5 | 10 | 3 |
| avg. Peel SS 24 hr dwell (lbs) | 5.2 | 5.4 | 5.7 | 5.7 | 5.7 |
| SAFT (° C.) | 40.0 | 73.7 | 79.0 | 83.3 | 52.3 |
| Loop Tack on SS | 5.5 | 4.4 | 3.8 | 2.8 | 5.0 |
| avg. Shear (hr), RT | 0.3 | 3.5 | 4.5 | 6.8 | 0.9 |
| Hot Shear (hr) @ 65° C. | 0.1 | 0.5 | 0.9 | 1.1 | 0.2 |

| Composition | Ex. Comp H | Comp I | Comp J | Comp K | Comp L |
|---|---|---|---|---|---|
| mmole MMP/kg monomer | 16.73 | 25.09 | 25.09 | 2.09 | 2.09 |
| wt. % Reinforcing Polymer | 4 | 7.5 | 10 | 2 | 5 |
| avg. Peel SS 24 hr dwell (lbs) | 5.6 | 4.3 | 4.4 | 4.1 | 3.8 |
| SAFT (° C.) | 60.3 | 40.0 | 46.0 | 205+ | 205+ |
| Loop Tack on SS | 5.0 | 7.5 | 6.6 | 2.3 | 2.2 |
| avg. Shear (hr), RT | 1.4 | 0.5 | 1.3 | 33.6 | 75+ |
| Hot Shear (hr) @ 65° C. | 0.4 | 0.1 | 0.1 | 70+ | 70+ |

The test results described in Table 2 were performed as described below.

Preparing Adhesive Strips for Testing

A sheet of corona treated 50 micron polyethylene terephthalate (PET) film was direct coated with the wet emulsion PSA on a RK Print Coat Instruments K 202 Control Coater using a US-56 meyer rod, set at speed 4 to deliver a 50 g/m² coat weight. The coated PET sheet was allowed to air dry for 10 minutes and then oven dried at 105° C. for 3 minutes. The PET facestock coated with the PSA was then closed with a Chemsultants RP-12 silicone release liner. The sheet was cut into 1 inch wide strips with the grain of the drawdown using a standard cutting board. The cut strips were then aged overnight in a controlled temperature and humidity room at 22° C. and 50% humidity. The adhesive strips were then ready to be used for testing.

24 Hour Stainless Steel (SS) 180° Peel

The release liner of an adhesive strip was removed and then the exposed strip was applied lengthwise to a clean 5 cm by 15 cm stainless steel panel. The panel with the strip on it was then placed on a ChemInstruments Rolldown automated roller which applied a 2 kg roller at a rate of 30 cm per minute to the panel. The prepared strip was then aged in a temperature and humidity controlled room at 22° C. and 50% humidity for 24 hours. After 24 hours, the strip on the panel was mounted onto an Analogic Measurometer II peel tester to perform 180° peel at a rate of 30 cm per minute. Measurements were in ounces which were converted into pounds (1 pound=16 ounces=4.4 Newtons).

2.5 cm×2.5 cm×1.8 kg Room Temperature (RT) Shear Test:

The release liner of an adhesive strip was removed and then the exposed strip was applied lengthwise to a clean 5 cm by 15 cm stainless steel panel with about an inch of the strip hanging over the end of the panel. The panel with the strip on it was then placed on a ChemInstruments Rolldown automated roller which applied a 2 kg roller at a rate of 30 cm per minute to the panel. A set 2.5 cm metal stamp was placed over the end of the panel with the extra length of strip hanging over, and with a blade, a 2.5 cm by 2.5 cm section of the strip was cut. The remaining length of the tape was removed from the panel and then the panel was prepared for the shear bar. The extra tape hanging over the panel was reinforced with a 2.5 cm by 2.5 cm cardboard square and then further reinforced with masking tape and staples. Next a hole punch was used to create a hole in the middle of the reinforced overhanging area. The panel was then mounted into a slot on a Scientific Machine & Co. shear bar. The timer was zeroed and a 1.8 kg weight was hung from the hole in the strip. Measurements were in hours.

Hot Shear at 65° C.

The release liner of an adhesive strip was removed and then the exposed strip was applied widthwise to a clean 5 cm by 7.5 cm stainless steel panel with about 2.5 cm of the strip hanging over the end of the panel. The panel with the strip on it was then placed on a ChemInstruments Rolldown automated roller which applied a 2 kg roller at a rate of 30 cm per minute to the panel. A set 2.5 cm metal stamp was placed over the end of the panel with the extra length of strip hanging over, and with a blade, a 2.5 cm by 2.5 cm section of the strip was cut. The remaining length of the tape was removed from the panel and then the panel was prepared for the hot shear test. The extra tape hanging over the panel was reinforced with a 2.5 cm by 2.5 cm cardboard square and then further reinforced with masking tape and staples. Next a hole punch was used to create a hole in the middle of the reinforced overhanging area. The panel was then mounted into a slot on a ChemInstruments 30 Bank Shear Tester which was in a Gruenberg oven set at 65° C. The timer was zeroed and a 1 kg weight was hung from the hole in the strip. Measurements were in minutes.

Shear Adhesion Failure Temperature (SAFT)

The release liner of an adhesive strip was removed and then the exposed strip was applied widthwise to a clean 5 cm by 7.5 cm stainless steel panel with about 2.5 cm of the strip hanging over the end of the panel. The panel with the strip on it was then placed on a ChemInstruments Rolldown automated roller which applied a 2 kg roller at a rate of 30 cm per minute to the panel. The roller completed a full cycle, up and back, on the panel to complete applying the proper amount of pressure to the panel. A set 2.5 cm metal stamp was placed over the end of the panel with the extra length of strip hanging over, and with a blade, a 2.5 cm by 2.5 cm section of the strip was cut. The remaining length of the tape was removed from the panel and then the panel was prepared for the SAFT test. The extra tape hanging over the panel was reinforced with a 2.5 cm by 2.5 cm cardboard square and then further reinforced with masking tape and staples. Next a hole punch was used to create a hole in the middle of the reinforced overhanging area. The panel was then mounted into a slot on a ChemInstruments 30 Bank Shear Tester which was in a Gruenberg oven set at 40° C. The timer was zeroed and a 1 kg weight was hung from the hole in the strip and the SAFT program was initiated. There was a 20 minute hold at 40° C., then a 0.5° C. rise in temperature per minute up to 205° C. when the test was terminated. Measurements were in minutes and then converted to temperature via a SAFT chart to give the adhesive SAFT temperature.

Loop Tack Test

The release liner of a 12.5 cm adhesive strip was removed and then the exposed strip was fashioned into a loop by having its ends touch with the adhesive side out. Masking tape was wrapped around the ends to secure the loop and a staple was put in that secured area to create an edge for a better connection to the loop tester. The secured end of the loop was mounted into the clamp of a Chatillon DFM10 loop tack tester. A 2.5 cm wide stainless steel panel was then mounted and screwed down to the substrate area. The load cell was zeroed and the test was started. The loop was brought down to cover the 2.5 cm by 2.5 cm cross section of the panel and then was immediately brought up to measure tack. Measurements were in pounds (1 pound=4.4 Newtons).

The data set forth in Table 2 are averages of three measurements for each parameter.

We claim:

1. A multi-stage emulsion polymer comprising (a) 90 to 99.5 wt. % of a first polymer, based on total weight of the first polymer and a reinforcing polymer, wherein the first polymer is formed from at least one ethylenically unsaturated monomer, and has a Tg of less than −20° C., and is polymerized in the presence of 3 to 12 mmoles of chain transfer agent per kg of monomers in the first polymer and is optionally polymerized in the presence of a low molecular weight polymeric component; (b) 0.5 to 10 wt. % of the reinforcing polymer based on total weight of the first polymer and the reinforcing polymer, wherein the reinforcing polymer is formed from 10 to 100 wt. %, based on total weight of the reinforcing polymer, of monomers having two or more alpha, beta-ethylenically unsaturated groups wherein the monomers used to form the reinforcing polymer are dispersed in the first polymer and swell the first polymer prior to polymerization of the monomers used to form the reinforcing polymer and (c) a tackifier having a softening point of 70° C. or higher.

2. The emulsion polymer of claim 1, wherein the chain transfer agent is selected from the group consisting of mercaptans, polymercaptans, alcohols and polyhalogen compounds.

3. The emulsion polymer of claim 1, wherein said first polymer is polymerized in the presence of 4 to 9 mmoles of chain transfer agent per kg of monomers in said first polymer.

4. The emulsion polymer of claim 1, wherein 20 to 100 wt. % of the monomers forming the reinforcing polymer, based on the total weight of thereinforcing polymer, are monomers having two or more alpha, beta-ethylenically unsaturated groups.

5. A latex polymer emulsion prepared by a process comprising the steps:
   (a) polymerization by emulsion polymerization of a first stage polymer comprising at least one ethylenically unsaturated monomer, wherein the first stage polymer has a Tg of less than −20° C., and wherein the polymerization is carried out in the presence of 3 to 12 mmoles of chain transfer agent per kg of monomers in the first stage;
   (b) adding monomers to the first stage polymer, which monomers will form the reinforcing polymer, wherein the added monomers are selected such that the reinforcing polymer is formed from 10 to 100 wt. %, based on total weight of the reinforcing polymer, of monomers having two or more alpha, beta-ethylenically unsaturated groups, wherein the addition is carried out under conditions wherein no significant polymerization occurs; and
   (c) polymerizing the added monomers to form the reinforcing polymer in the presence of the first stage polymer.

6. The latex polymer emulsion of claim 5, wherein the first stage polymer is polymerized in the presence of 4 to 9 mmoles of chain transfer agent per kg of monomers in the first polymer.

7. A composite article formed from a substrate and a multi-stage emulsion polymer, wherein said emulsion polymer comprises:
- (a) 90 to 99.5 wt. % of a first polymer, based on total weight of first polymer and reinforcing polymer, wherein the first polymer is formed from at least one ethylenically unsaturated monomer, and has a Tg of less than −20° C., and is polymerized in the presence of 3 to 12 mmoles of chain transfer agent per kg of monomers in the first polymer; and
- (b) 0.5 to 10 wt. % of a reinforcing polymer based on total weight of first polymer and reinforcing polymer, wherein the reinforcing polymer either has a Tg of 60° C. or higher, or is formed from monomers having two or more alpha, beta-ethylenically unsaturated groups, or combinations thereof.

8. The composite article of claim 7, wherein said substrate is selected from the group consisting of tape and label backing, rigid and flexible films, metallized films, synthetic and natural foams, thermoplastic and thermosetting substrates, flocked substrates, plasticized and non-plasticized polymeric substrates, paper, cardboard, plasticbased composites, cellulosic-based composites, and metals.

9. The composite article of claim 7, wherein the first polymer is polymerized in the presence of 4 to 9 mmoles of chain transfer agent per kg of monomers in the first polymer.

10. A pressure sensitive adhesive (PSA) composition comprising comprising a multi-stage emulsion polymer comprising (a) 90 to 99.5 wt. % of a first polymer, based on total weight of the first polymer and a reinforcing polymer, wherein the first polymer is formed from at least one ethylenically unsaturated monomer, and has a Tg of less than −20° C., and is polymerized in the presence of 3 to 12 mmoles of chain transfer agent per kg of monomers in the first polymer and is optionally polymerized in the presence of a low molecular weight polymeric component; (b) 0.5 to 10 wt. % of a the reinforcing polymer based on total weight of the first polymer and the reinforcing polymer, wherein the reinforcing polymer is formed from 10 to 100 wt. %, based on total weight of the reinforcing polymer, of monomers having two or more alpha, betaethylenically unsaturated groups wherein the monomers used to form the reinforcing polymer are dispersed in the first polymer and swell the first polymer prior to polymerization of the monomers used to form the reinforcing polymer; and (c) a tackifier having a softening point of 70° C. or higher.

11. The PSA composition of claim 10, wherein the chain transfer agent is selected from the group consisting of mercaptans, polymercaptans, alcohols and polyhalogen compounds.

12. The PSA composition of claim 10, wherein said first polymer is polymerized in the presence of 4 to 9 mmoles of chain transfer agent per kg of monomers in said first polymer.

13. The PSA composition of claim 10, wherein 20 to 100 wt. % of the monomers forming the reinforcing polymer, based on the total weight of the reinforcing polymer, are monomers having two or more alpha, beta-ethylenically unsaturated groups.

* * * * *